United States Patent Office 2,959,470
Patented Nov. 8, 1960

2,959,470

IRON DERIVATIVES

John Gerard McNicholl, 490 Howth Road, Raheny, Dublin, Ireland

No Drawing. Filed June 20, 1956, Ser. No. 592,477

Claims priority, application Great Britain June 23, 1955

4 Claims. (Cl. 23—200)

This invention relates to the preparation of Iron Derivatives and is particularly concerned with a process for the preparation of an iron derivative for use in paints etc. According to the present invention, there is provided a process for the preparation of an iron derivative for use in paints etc., comprising the steps of mixing under dry conditions finely powdered calcium carbonate or other alkali or alkaline carbonate such as soda ash, and ferrous sulphate; both having a grain size below 200 mesh, the ratio by weight of the sulphate to the carbonate being between 1:4 and 4:1, allowing the mixture to absorb atmospheric moisture at room temperature for a period of between 4 and 7 days and storing the mixture at room temperature for about 3 weeks, the mixture being thereafter dried and powdered to a grain size below 200 mesh.

In order to obtain a high quality product, up to 15% by weight based on the sulphate, of the product from a previous batch or other nucleus, is preferably added to the carbonate and sulphate mixture before the latter is moistened. The mixture is also preferably subjected to plastic grinding and washing with water before being dried. The washing may take place in two steps, a first step in which the water contains up to 1.5% by weight of sodium silicate or Teepol and a second step in which pure water or water containing sodium thiosulphate is used.

For a better understanding of the invention and to show how the same is to be carried into effect, one method of preparing an iron derivative will now be indicated:

100 lbs. of powdered calcium carbonate having a grain size of about 350 mesh B.S.S. were mixed in a horizontal rotary drum with approximately 60 lbs. of the iron product from a previous batch. The mixture was rotated in the drum for approximately half an hour to ensure intimate mingling of the two components. 400 lbs. of commercial, partially dehydrated crystalline ferrous sulphate were powdered to a grain size of about 350 mesh B.S.S. and added to the mixture the resulting three component mixture being slowly rotated in the drum for a period of between 1 and 2 hours. The above mixing was carried out in both cases under essentially dry conditions.

The mixture was then allowed to absorb atmospheric moisture, for a period of between 4 and 7 days (a test experiment showed that the moistened mixture had increased in weight by about 3%. The moistened mixture was thereafter manually or otherwise pressed into a static drum to ensure tight packing and stored in the drum for about three weeks at ambient temperature, i.e., about 25° C.

The mixture was then removed from the drum and plastically ground preferably in a pug mill. Water containing 0.5% sodium silicate was then added to the mixture to bring the latter to the consistency of a tacky paste, and the paste was thereafter washed with water until found to be free from calcium sulphate. The wash water preferably contained a small amount of sodium thiosulphate. The preliminary washing with the aqueous solution of sodium silicate could be omitted, but the product then obtained would be of lower quality.

After the washing the mixture was removed from the mill and left to dry in air for a period of between 3 and 4 days. The mixture was then found to set in the form of cakes or lumps. The latter were drum dried at about 105° C. for a period of about 2 hours. Finally the dried product was converted to a powder having a grain size of about 350 mesh B.S.S. in a hammer mill and was found to consist essentially of a light yellow partially hydrated ferric oxide.

This product was found to be highly effective as a tinting agent in paints and gave red anhydrous ferric oxide $Fe_2O_3$ on calcining.

Instead of pure calcium carbonate ordinary chalk may be used or other alkali or alkaline carbonate but the mixture must then be screened to remove impurities such as silica.

I claim:

1. Method of producing a preparation essentially of ferric hydroxide which comprises mixing powdered ferrous sulfate and a powdered carbonate of at least one of the elements selected from the group consisting of calcium, sodium, potassium and magnesium, exposing the resulting mixture to the atmosphere and allowing it to absorb only atmospheric moisture, and then tightly packing said mixed powdered materials into an enclosed and static space and allowing said materials a sufficient time to react completely without disturbance.

2. Method of producing a preparation essentially of ferric hydroxide which comprises mixing powdered ferrous sulfate and a powdered carbonate of at least one of the elements selected from the group consisting of calcium, sodium, potassium and magnesium, exposing the resulting mixture to the atmosphere and allowing it to absorb only atmospheric moisture, then tightly packing said mixed powdered materials into an enclosed and static space and allowing said materials a sufficient time to react completely without disturbance, and thereafter washing and drying.

3. Method of producing a preparation essentially of ferric hydroxide which comprises mixing powdered ferrous sulfate and a powdered carbonate of at least one of the elements selected from the group consisting of calcium, sodium, potassium and magnesium, and a nucleus of ferric hydroxide, exposing the resulting mixture to the atmosphere and allowing it to absorb only atmospheric moisture, and then tightly packing said mixed powdered materials into an enclosed and static space and allowing said materials a sufficient time to react completely without disturbance.

4. Method of producing a preparation essentially of ferric hydroxide which comprises mixing powdered ferrous sulfate and a powdered carbonate of at least one of the elements selected from the group consisting of calcium, sodium, postassium and magnesium, and a nucleus of ferric hydroxide, exposing the resulting mixture to the atmosphere and allowing it to absorb only atmospheric moisture, then tightly packing said mixed powdered materials into an enclosed and static space and allowing said materials a sufficient time to react completely without disturbance, and thereafter washing and drying.

References Cited in the file of this patent

UNITED STATES PATENTS

| Number | Name | Date |
|---|---|---|
| 20,655 | Monnier | June 22, 1858 |
| 635,389 | Ramage | Oct. 24, 1899 |
| 1,337,402 | Hemingway | Apr. 20, 1920 |
| 1,435,928 | Kipper | Nov. 21, 1922 |
| 1,531,991 | Speller | Mar. 31, 1925 |
| 2,007,233 | Wespy | July 9, 1935 |
| 2,316,039 | Wilson | Apr. 6, 1943 |